United States Patent [19]

Rosenkranz

[11] Patent Number: 5,618,151

[45] Date of Patent: Apr. 8, 1997

[54] STREET VEHICLE FOR PASSENGER AND CARGO TRANSPORT FACILITATING LOADING AND DISCHARGE

[76] Inventor: Volker H. Rosenkranz, 21 King St., Hampton Falls, N.H. 03844

[21] Appl. No.: 346,140

[22] Filed: Nov. 29, 1994

[51] Int. Cl.$^6$ .................................................. B65G 67/00
[52] U.S. Cl. ........................ 414/495; 414/460; 414/474; 414/537; 414/921; 280/43; 280/781; 180/234; 180/781; 296/25
[58] Field of Search ..................... 414/537, 471, 414/474, 495, 459, 460, 540, 921, 545; 280/781, 43; 180/234, 6.5; 296/61, 62, 155, 25

[56] References Cited

U.S. PATENT DOCUMENTS

| | | | |
|---|---|---|---|
| 2,820,667 | 1/1958 | Benaroya et al. | 296/155 X |
| 3,135,401 | 6/1964 | Schramm | 414/537 |
| 3,197,229 | 7/1965 | Houlton | 414/460 X |
| 3,874,537 | 4/1975 | Kou | 214/501 |
| 4,122,962 | 10/1978 | Goodwin, Sr. | 414/460 |
| 4,236,859 | 12/1980 | Stearn et al. | 414/460 |
| 4,339,224 | 7/1982 | Lamb | 414/921 X |
| 4,500,248 | 2/1985 | Kramer | 414/459 |
| 4,518,057 | 5/1985 | McCallum | 414/537 X |
| 4,796,537 | 1/1989 | Besser | 414/537 X |
| 4,847,972 | 7/1989 | Anderson et al. | 29/401.1 |
| 4,898,508 | 2/1990 | Hayata | 414/495 X |
| 4,919,225 | 4/1990 | Sturges | 180/210 |
| 5,137,413 | 8/1992 | Ressler | 414/474 |
| 5,165,838 | 11/1992 | Kallansrude et al. | 414/471 |
| 5,222,568 | 6/1993 | Higasa et al. | 180/234 X |

FOREIGN PATENT DOCUMENTS

| | | | |
|---|---|---|---|
| 0018036 | 4/1980 | European Pat. Off. . | |
| 69714 | 1/1983 | European Pat. Off. | 180/234 |
| 0417820 | 7/1990 | European Pat. Off. . | |
| 472785 | 3/1992 | European Pat. Off. | 296/25 |
| 2444603 | 3/1970 | France . | |
| 2543080 | 9/1984 | France | 414/460 |
| 2845441C2 | 10/1978 | Germany . | |
| 2011151 | 7/1988 | Germany . | |
| 3841017 | 6/1990 | Germany | 414/921 |
| 1102690 | 7/1984 | U.S.S.R. | 180/234 |
| 2220172 | 6/1979 | United Kingdom . | |
| 2276854 | 10/1994 | United Kingdom | 180/6.5 |

Primary Examiner—Karen B. Merritt
Assistant Examiner—Stephen Gordon
Attorney, Agent, or Firm—Bromberg & Sunstein LLP

[57] ABSTRACT

A motor vehicle for carrying a load over a street has in a preferred embodiment a bottom platform for supporting the load, a frame, disposed above the bottom platform and mounted to it, for providing structural integrity to the vehicle, a plurality of wheels rotatably mounted to the frame, and a door arrangement disposed on a side of the vehicle. In further embodiments, the wheels are retractable, so as to permit the bottom platform to approach the street level to facilitate loading and unloading of the vehicle. Additionally, the door arrangement includes a large doorway and a plurality of doors, each door slidably mounted, and all doors are movable to an open position located near an end of the vehicle to expose the large doorway to facilitate loading and unloading of the vehicle. A ramp is hingedly attached to bottom platform, so that the ramp may be folded into an up position and unfolded into a down position, and in the down position it may provide a smooth transition from the bottom platform to street level.

9 Claims, 11 Drawing Sheets

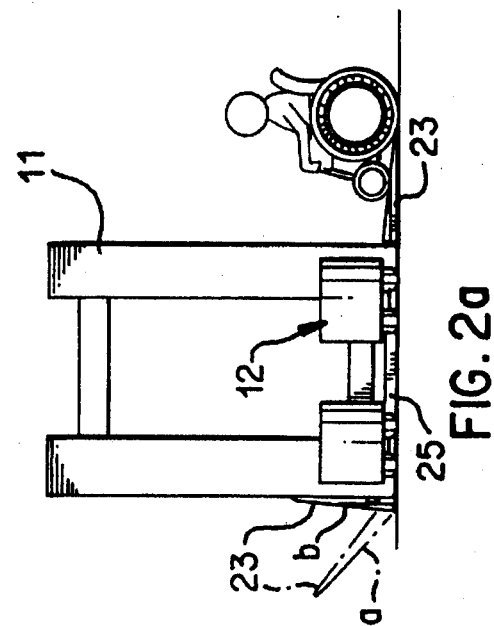
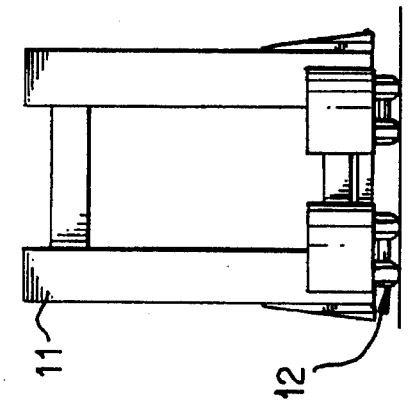
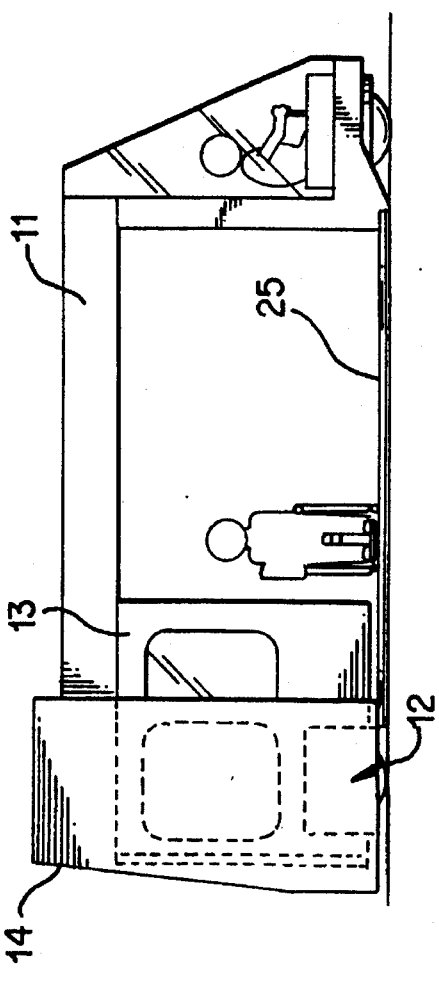
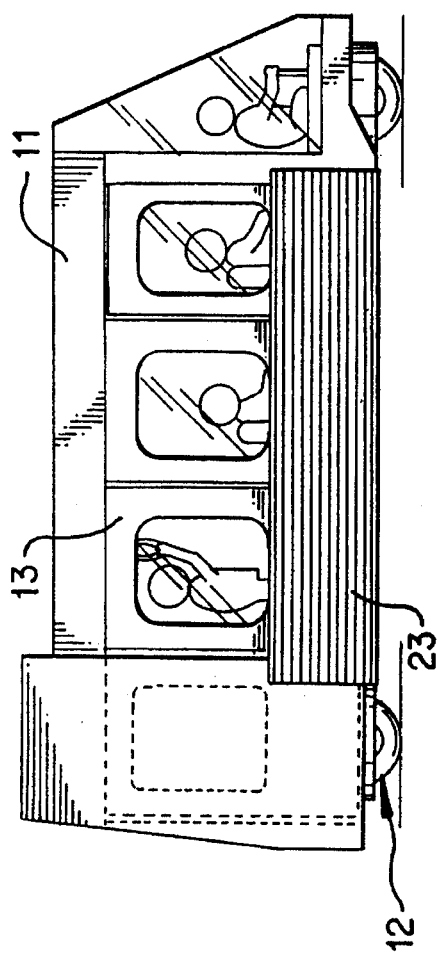

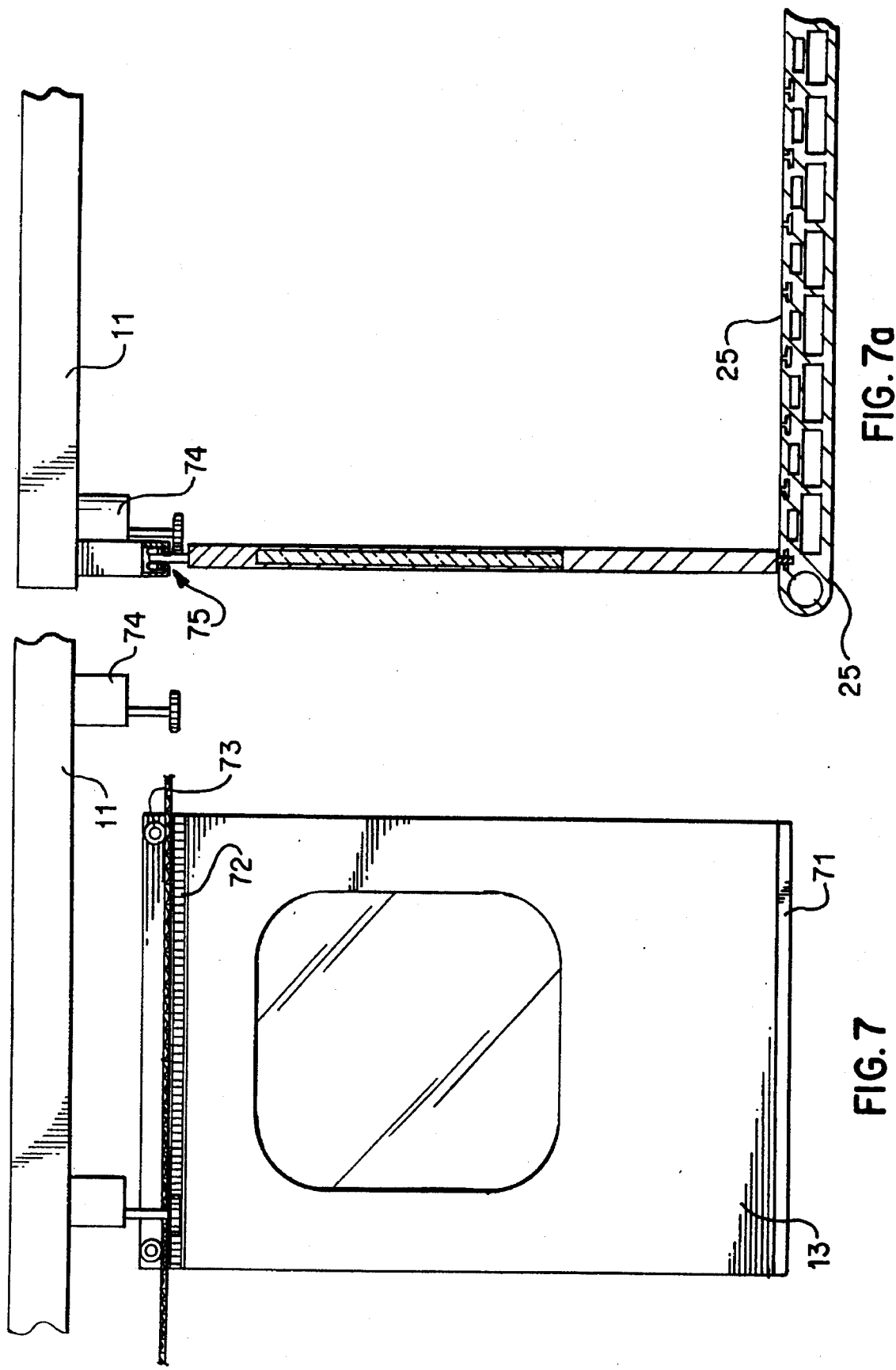

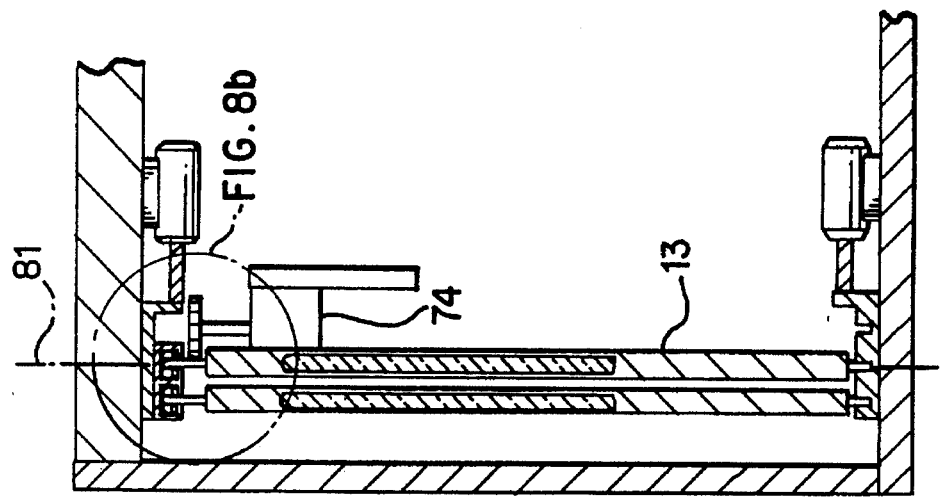
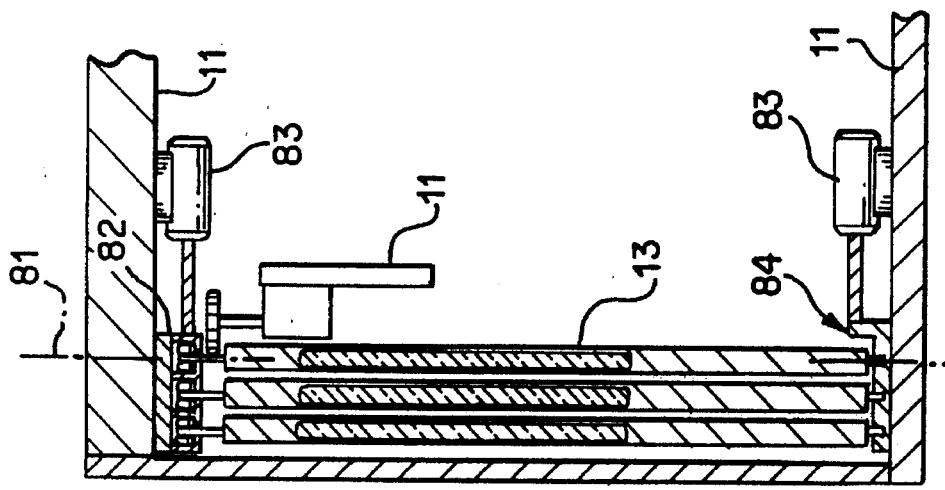

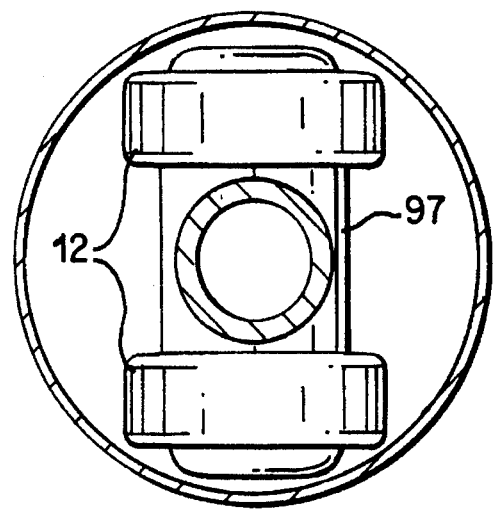
FIG. 9b
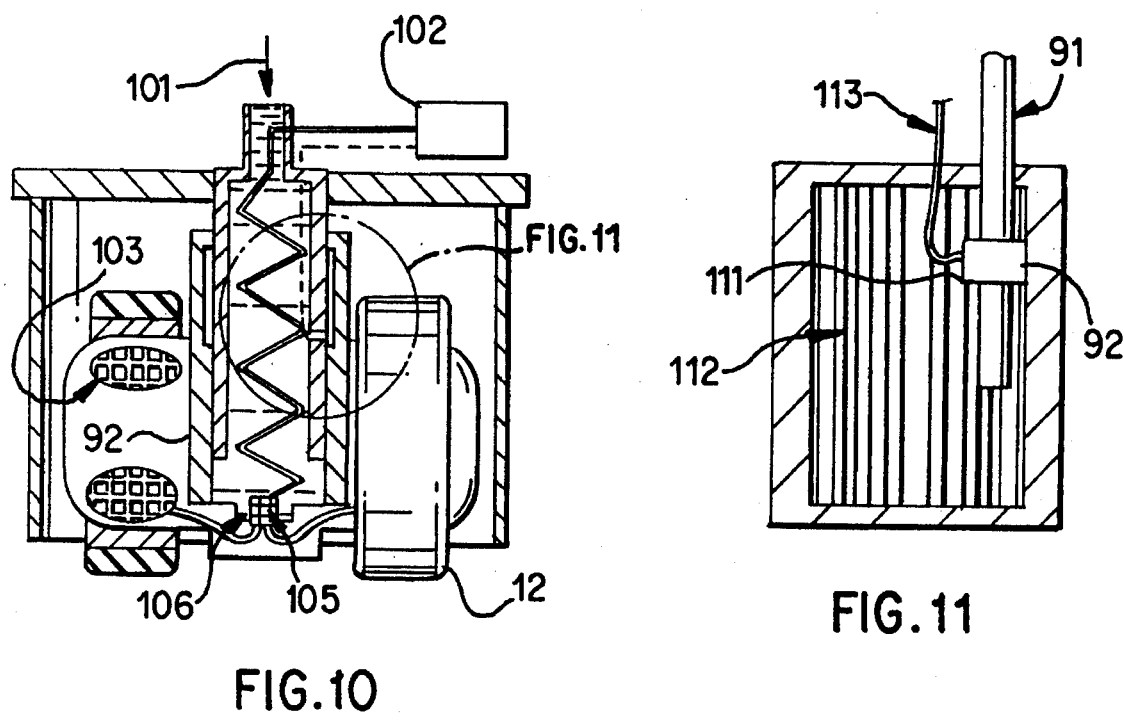
FIG. 10
FIG. 11

1

STREET VEHICLE FOR PASSENGER AND CARGO TRANSPORT FACILITATING LOADING AND DISCHARGE

FIELD OF THE INVENTION

The present invention relates to street vehicles for the transport of passengers and cargo.

BACKGROUND ART

Modern design practices require that the loads borne by typical taxis, passenger cars, buses, vans and trucks be supported by a chassis or frame disposed beneath the load to provide structure for the vehicle; the walls, roof, and doors of the vehicle are held in relatively rigid relation to one another by attachment to the chassis. The chassis itself must be suspended over wheels, with the effect that the floor level of such vehicles must be placed at such a height that passengers typically require steps to enter and exit such vehicles, and cargo must be lifted by means of fork trucks, manpower or loading platforms. Loading and discharge of passengers and cargo under these circumstances are necessarily cumbersome and may generate traffic delays in the loading and discharge areas. People with disabilities, wheelchairs, baby-strollers and suitcases cannot easily enter and exit traditional vehicles, and typically require considerable assistance.

To help facilitate loading and discharge of passengers or cargo, there have been developed and placed in use a variety of devices providing special lifting platforms for wheelchairs, pallets, and the like; such devices are typically placed on the side or the rear of buses or vans. These devices, however, are slow and dangerous and do not generally allow for loading or unloading of more than a single person or cargo item at a time.

A related problem in vehicle design is the path of cargo and passengers between the interior of the vehicle and its doors. The path is typically somewhat tortuous, and cargo being loaded, for example, must be funneled through relatively narrow doors dictated by vehicle geometry and thereafter redistributed into the interior of the vehicle.

SUMMARY OF THE INVENTION

In accordance with the invention, there is provided a motor vehicle for carrying a load over a street. In a preferred embodiment, the vehicle has a bottom platform for supporting the load, a frame, disposed above the bottom platform and mounted to it, for providing structural integrity to the vehicle, a plurality of wheels rotatably mounted to the frame, and a door arrangement disposed on a side of the vehicle. In further embodiments, the wheels are retractable, so as to permit the bottom platform to approach the street level to facilitate loading and unloading of the vehicle. Additionally, the door arrangement includes a large doorway and a plurality of doors, each door slidably mounted, and all doors are movable to an open position located near an end of the vehicle to expose the large doorway to facilitate loading and unloading of the vehicle. A ramp is hingedly attached to bottom platform, so that the ramp may be folded into an up position and unfolded into a down position, and in the down position it may provide a smooth transition from the bottom platform to street level.

BRIEF DESCRIPTION OF THE DRAWINGS

The invention will be more readily understood by reference to the following description, taken with the accompanying drawings, in which:

FIG. 1 is a side view of a vehicle, in accordance with a preferred embodiment of the invention, in driving position.

FIG. 1a is a rear view, partially cut away, of the vehicle of FIG. 1.

FIG. 2 is a side view of the vehicle of FIG. 1 in loading position with open doors.

FIG. 2a is a rear view, partially cut away, of the same vehicle in loading position with open doors.

FIG. 7 is a partially cut away side view presenting detail of the door of the vehicle of FIG. 1 with upper guide and motors attached to the portal frame.

FIG. 7a is a partially cut away view in cross section of the door of FIG. 7, showing the upper guide, motor and portal frame and the lower guide in the bottom platform.

FIG. 8 is a partial cut away view in cross section of the rear compartment of the vehicle of FIG. 1, showing 3 stored doors, the guide shuttle and the shuttle motor-hydraulic system.

FIG. 8a is similar to FIG. 8, but showing the shuttle moved over one step and one door released.

FIG. 9b is a partial cut away view from the top of the wheel set of FIG. 9.

FIG. 10 is a partial cut away of the wheel set of FIG. 9, this time showing the wheels in retracted position.

FIG. 11 is a detail of the sensor for wheel steering input.

DETAILED DESCRIPTION OF SPECIFIC EMBODIMENTS

Figure 3:
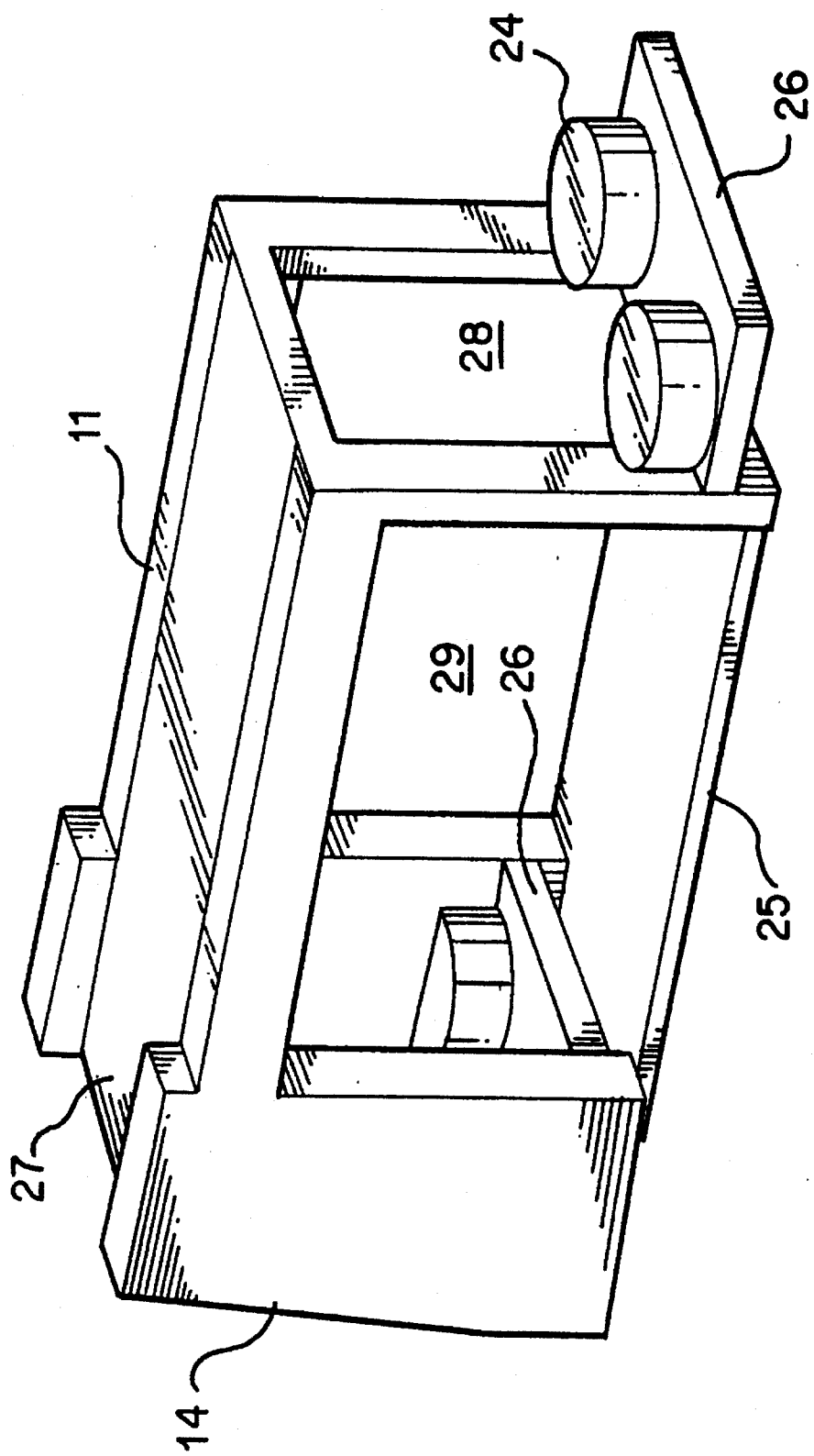
FIG. 3 is a perspective view of an embodiment of the portal frame structure of the vehicle of FIG. 1.

FIG. 1 is a side view of a vehicle, in accordance with a preferred embodiment of the invention, in driving position.

FIG. 1a is a rear view, partially cut away, of the same vehicle. In FIGS. 2 and 2a the vehicle is shown in loading position with open doors. As shown in these figures, the vehicle, suitable for passengers and/or cargo, utilizes a frame construction that is the inverse of conventional vehicles. Instead of being placed conventionally beneath the load-bearing portions of the vehicle, the frame 11 of this embodiment is of a portal- or bridge-type design, disposed above the load, thereby allowing the load-bearing bottom platform 25 to be of minimal construction height. The frame 11 will be described in further detail below in connection with FIG. 3. The wheels 12 of the vehicle are retractable to such an extent that the bottom platform 25 settles on the street surface in the course of loading and unloading. For driving the vehicle, the wheels 12 are placed in a fully extended position.

As shown in FIGS. 2 and 2a and later figures, both sides of the vehicle are open for easy entering and loading. During driving and on the no-loading side, the sides are covered by laterally movable doors 13. During loading and entering, the doors move into the rear compartment 14 (shown in FIG. 3) of the vehicle to provide full or partial opening of the loading entrance. A ramp 23 is hingedly attached to the vehicle on each side and is shown folded in the up position in FIG. 1. When unfolded, as shown in FIG. 2a, the ramp 23 provides a smooth transition from street level to the bottom platform 25 and the interior of the vehicle.

FIG. 3 is a perspective view of an embodiment of the portal frame structure of the vehicle of FIG. 1. As shown in FIG. 3, the structure of the frame 11 includes beams and columns providing a rigid bridge to bear the load on the bottom platform 25. The frame 11 is thus disposed above the bottom platform and mounted to it, and provides structural integrity to the vehicle. The construction of this embodiment provides ample space on the sides for the loading opening 29, in the front for the access to the driver's cabin 28 and in the rear compartment 14 for auxiliaries or access to the main motor or battery. The frame is formed by the two side panels, the roof construction 27, the driver's cabin floor 26 and the wheel set housings 24. Each wheel set housing, being cylindrically shaped, has a force-transmitting portion disposed immediately in front, behind, and on each side of a recess, the housing is force-transmitting since it transmits force developed by traction of the wheels against the ground to the vehicle frame.

Figure 4:
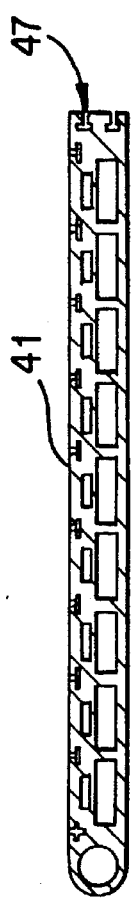
FIG. 4 is a cross section of a platform module forming part of the bottom platform of the vehicle of FIG. 1.
Figure 4A:
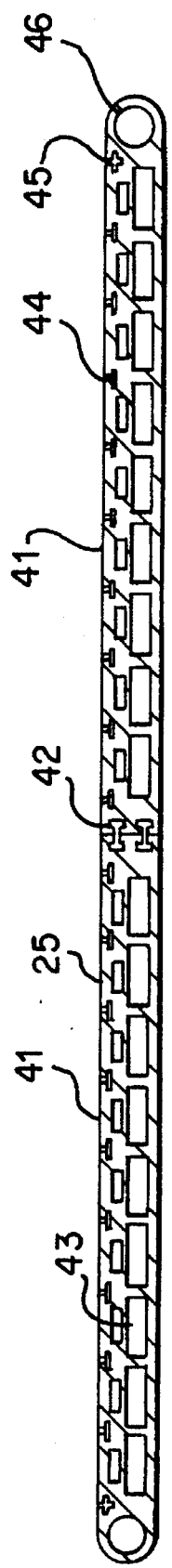
FIG. 4a is a cross section of the bottom platform resulting from the combination of a pair of platform modules shown in FIG. 4.
Figure 4B:
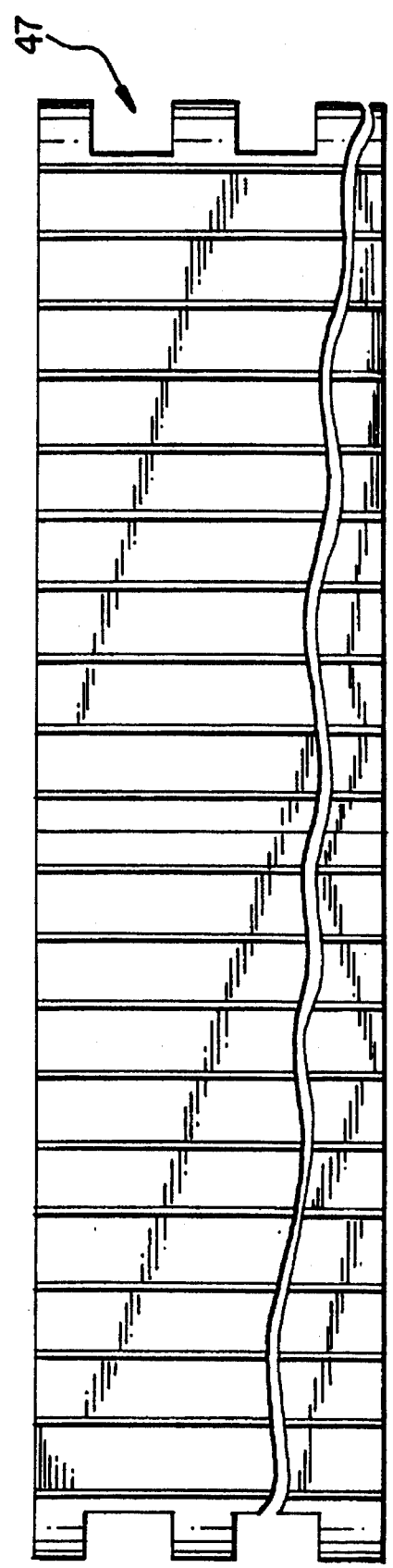
FIG. 4b is a top view of a portion of the bottom platform of the vehicle of FIG. 1 showing location for placement of hinges for the ramps of the vehicle.

FIG. 4 shows in cross section a platform module forming part of the bottom platform of the vehicle of FIG. 1. As shown in FIGS. 4, 4a, and 4b, the bottom platform 25 of the vehicle of FIG. 1 is formed by a pair of extruded aluminum platform modules 41, each of the same pattern shown in FIG. 4, and connected in the center by profile anchors 42. The extruded platform modules contain slots and openings for purposes as follows: T-slots for center connection 47, core openings for weight reduction and wire conduit 43, surface slots 44 for fastening of chairs or cargo fixtures, door guide slots 45, ramp hinge hole 46. To accommodate the hinges of ramp 23, there are provided a series of rectangular openings 48 cut laterally into the bottom platform, as shown in FIG. 4b.

Figure 5:
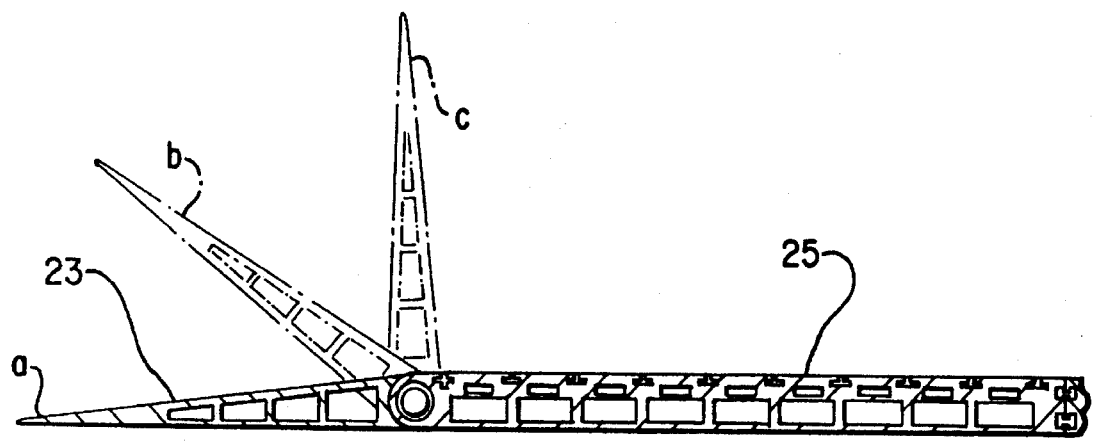
FIG. 5 is a cross section of a portion of the bottom platform of the vehicle of FIG. 1 with attached ramp in the positions a for loading, b partially raised, and c for driving.
Figure 5A:
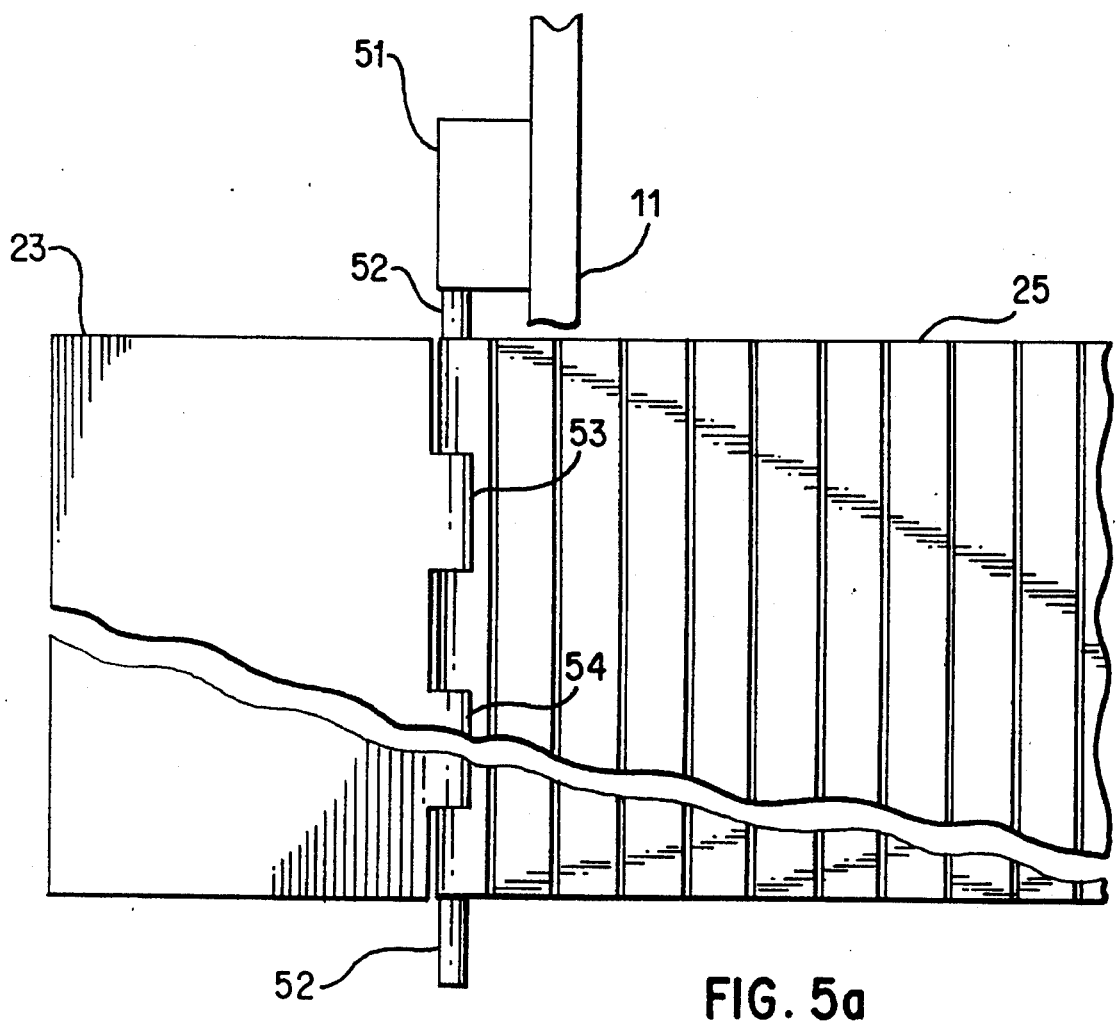
FIG. 5a is a partial cut away view of the bottom platform of the vehicle of FIG. 1 with the ramp in position a and showing the ramp lifting motor.

As shown in FIGS. 5 and 5a, the ramps 23 are preferably of extruded aluminum and are hinged to the bottom platform 25 by the positive hinge wings 54. Each ramp 23 is rotated between folded and unfolded positions by a motor 51 located in the back-compartment 14 coupled to a pivot shaft 52, which in turn applies torque via pins 53 to the ramp at the position of its positive hinge wings. During driving and on the non-loading side, the ramp 23 is folded against the side of the vehicle's frame post 11 and is secured by a locking mechanism. Thus the ramp in this position provides a source of crash prevention from side impacts.

Figure 6:
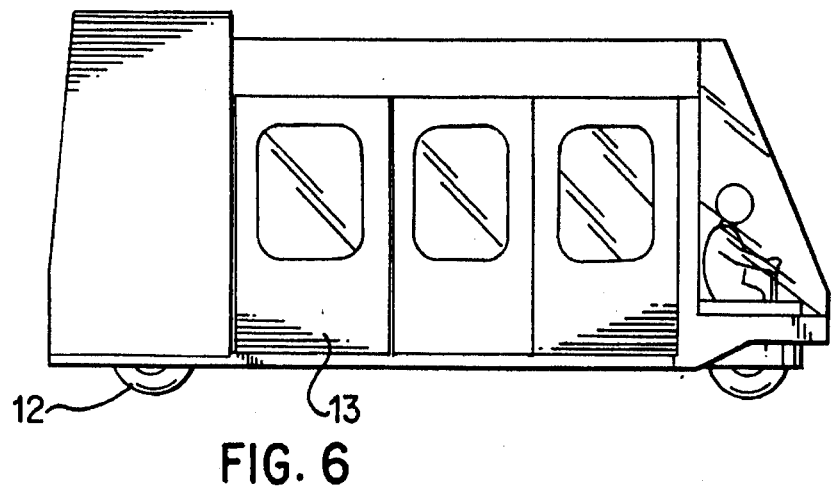
FIG. 6 is a side view of the vehicle of FIG. 1 with closed doors.
Figure 6A:
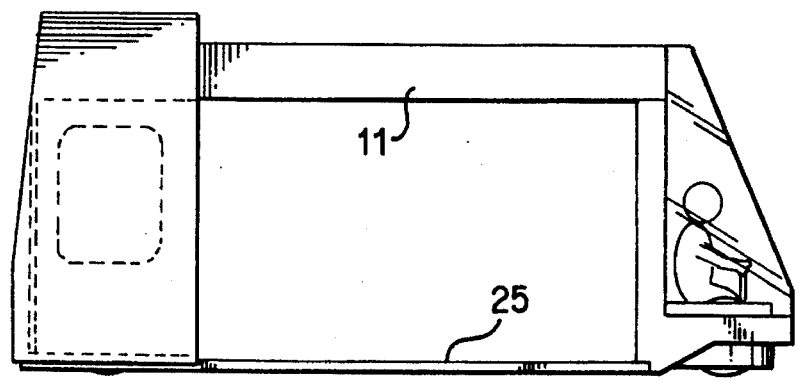
FIG. 6a is a side view of the vehicle of FIG. 1 in loading position with the doors fully retracted into the rear compartment.
Figure 6B:
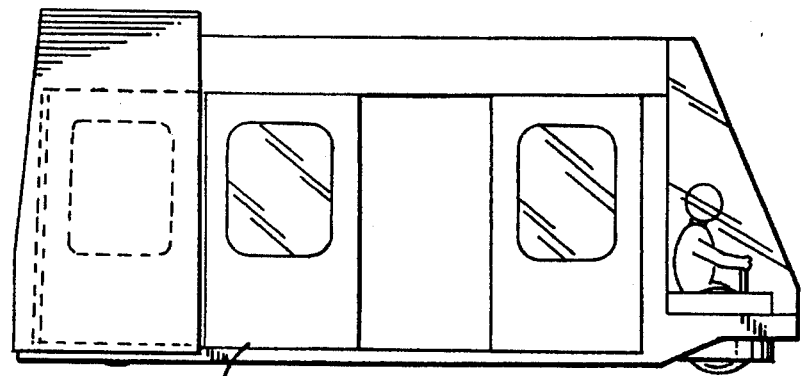
FIGS. 6b, 6c, 6d, and 6e are side views of the vehicle of FIG. 1 showing some possible door opening patterns of its independently actuated doors.
Figure 6C:
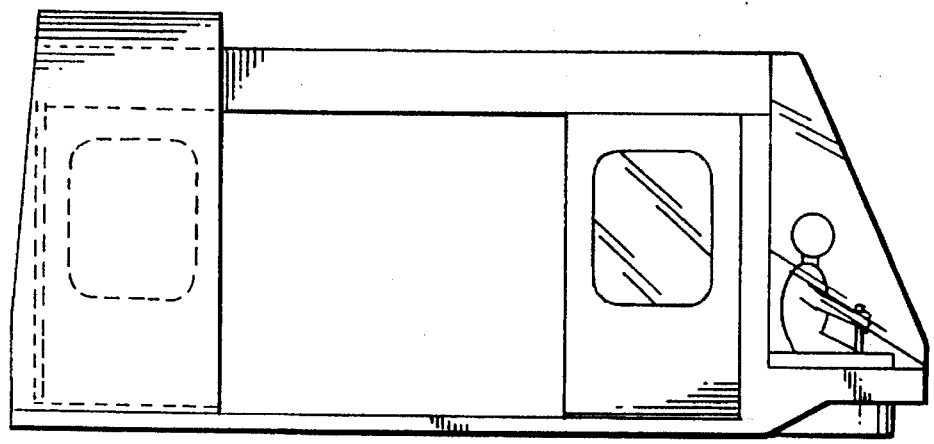
Figure 6D:
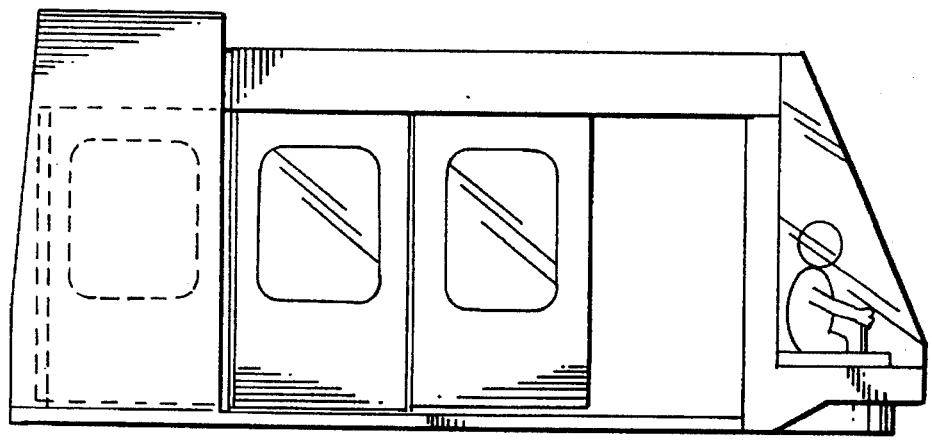
Figure 6E:
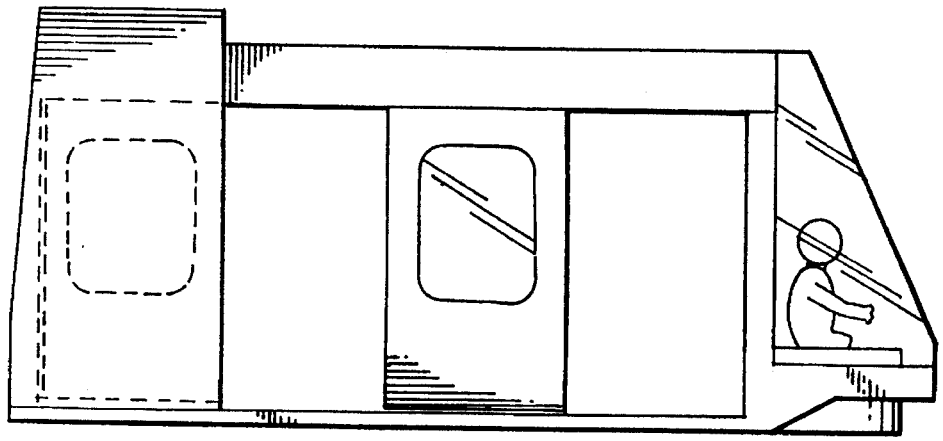

FIGS. 6a through 6d illustrate operation of the doors of the vehicle of FIG. 1. FIG. 6 is a side view of the vehicle with closed doors. FIG. 6a is a side view of the vehicle in loading position with the doors fully retracted into the rear compartment, and FIGS. 6b, 6c, and 6d are side views of the vehicle showing some possible door opening patterns. As shown in these figures, the vehicle is provided with multiple independent movable doors 13. They are supported and guided in the upper beam of the frame 11 and the bottom platform 25. To accommodate loading of small or wide loads respectively one or multiple doors are transferred to the rear-compartment and stored. Each door is individually movable; its relative position is determined utilizing sensors in a manner known in the art.

FIG. 7 is a partially cut away side view presenting detail of the door of the vehicle of FIG. 1 with upper guide and motors attached to the portal frame. FIG. 7a is a partially cut away view in cross section of the door of FIG. 7, showing the upper guide, motor and portal frame and the lower guide in the bottom platform. In these figures it can be seen that the door 13 runs on rollers 73 in a guide 75, which is attached to the frame 11. The movement is achieved by the action of a motor with gear wheel or friction wheel 74 and gear profile or friction band 72 on the upper part of the door. The lower guide 71 runs in the door guide slot 45 of the bottom platform 25.

Figure 8B:
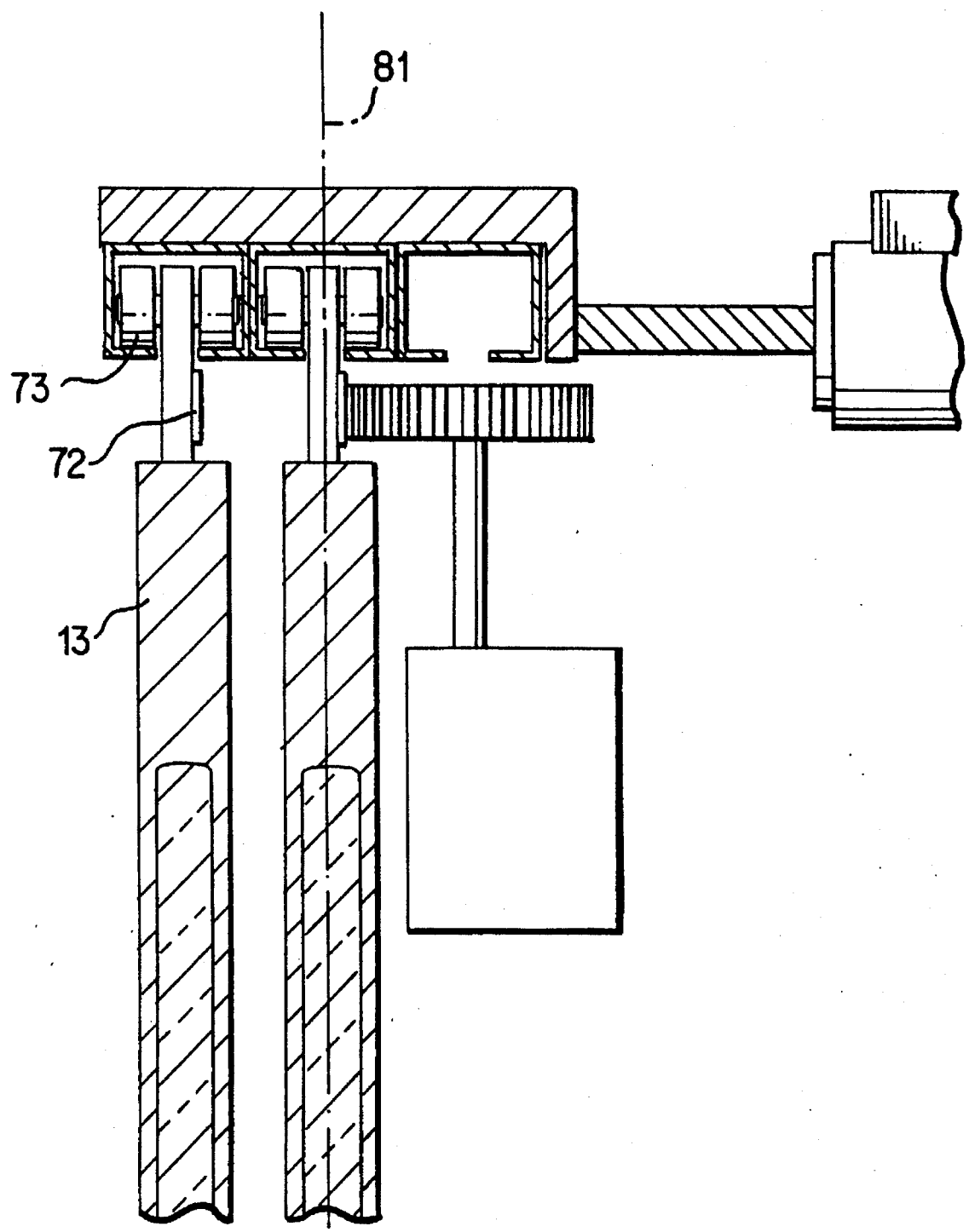
FIG. 8b is a detail of FIG. 8a, showing the upper guide shuttle and the door moving motor.

FIG. 8 is a partial cut away view in cross section of the rear compartment of the vehicle of FIG. 1, showing 3 stored doors, the guide shuttle and the shuttle motor-hydraulic system. FIG. 8a is similar to FIG. 8, but showing the shuttle moved over one step and one door released. FIG. 8b is a detail of FIG. 8a, showing the upper guide shuttle and the door moving motor. As shown in these figures, the doors are stored in the rear compartment 14 in an upper guide-shuttle 82 and lower guide-shuttle 84. This shuttle moves the active door 13 into the plane of door opening 81. The shuttle motor or hydraulic or pneumatic cylinder 83 steps the upper and lower guide shuttles and all stored doors. The door moving motor 74 transfers the doors into the guides 75 and 71 of the side opening of the frame 11.

Figure 9:
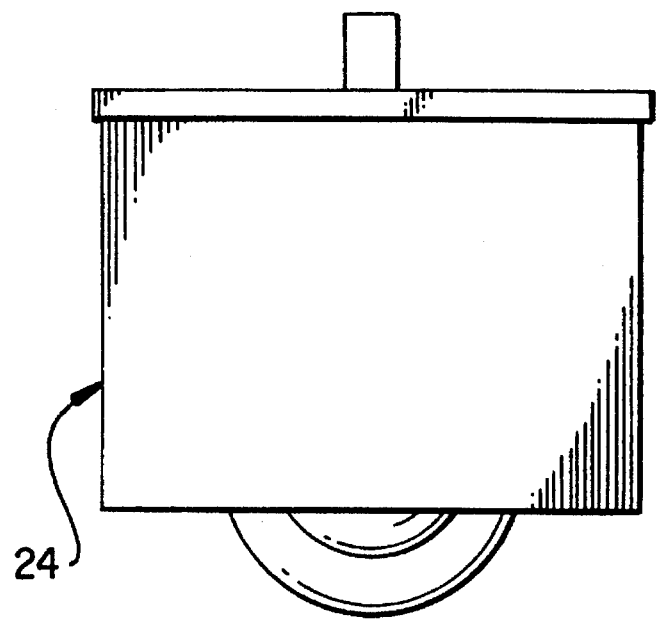
FIG. 9 is a side view of a wheel set for the vehicle of FIG. 1, with the wheels fully extended.
Figure 9A:
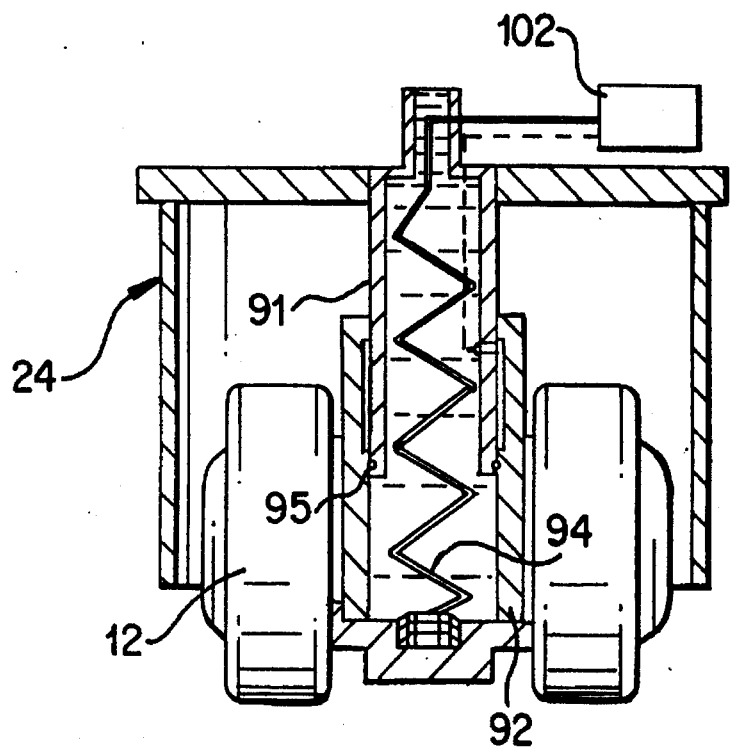
FIG. 9a is a partial cut away view of the wheel set of FIG. 9, still showing the wheels fully extended.

FIG. 9 is a side view of a wheel set for the vehicle of FIG. 1, with the wheels fully extended. FIG. 9a is a partial cut away view of the wheel set of FIG. 9, still showing the wheels fully extended. FIG. 9b is a partial cut away view from the top of the wheel set of FIG. 9. The wheel-sets 24 shown in these figures are individually controlled, electrically powered units. The retraction of the wheels 12 is achieved by a hydraulic piston and cylinder in a manner known in the art. The wheel-set 24 includes a pair of wheels 12 each individually powered by an electric motor 103 in its hub. Each wheel-set also includes a hydraulic piston 91, a hydraulic cylinder 92, a seal 95, and the motor-block 97. These can run with synchronous speed, thus steering the vehicle in a straight direction. To turn the vehicle, the two motors 103 (shown in FIG. 10) run at different speeds, thus turning the wheel pair.

The whole wheel pair 24 may be turned about a vertical axis, so that the wheels can be oriented at right angles to the direction of the vehicle's normal forward motion; the purpose of this orientation is to permit driving the vehicle directly from a traffic lane laterally to the curb for the purpose of loading or discharging passengers or cargo. To achieve this wheel orientation, the two motors of the wheel set are operated in opposite directions of rotation, thus turning the wheel pair on the spot.

FIG. 10 is a partial cut away of the wheel set of FIG. 9, this time showing the wheels in retracted position. FIG. 11 is a detail of the sensor for wheel steering input. The hydraulic connection 101 leads to the hydraulic system. The two independent motors 103 receive their electrical power via the controller 102, the spring wire conduit 94, the base connector 106 and the conduit 105. This conduit arrangement allows for turning of the wheel-pair up to 360 degrees and normal drive oscillations as well as the larger movement during wheel retraction. In the inner chamber of the hydraulic cylinder 92 are finely spaced optical or physical markings 112 which are measured by the sensor 111. The output from this sensor feeds the controller 102 through conduit 113. Thus the controller knows the relative position of piston 91 and cylinder 92.

What is claimed is:

1. A motor vehicle for carrying a load over a street, the vehicle comprising:
   (a) a bottom platform for carrying the load;
   (b) a frame of portal construction disposed over the bottom platform and mounted to it for bearing the load, the frame having left and right sides, a top, a front, and a rear, and a plurality of wheel set housings, each wheel set housing having a force-transmitting portion disposed immediately in front, behind, and on each side of a recess; the frame and the bottom platform defining an interior region, the interior region having at least one access opening;
   (c) a plurality of wheel sets, of which at least one pair of such wheel sets are laterally disposed from one another, each wheel set
      (i) having at least one wheel,
      (ii) being independently powered and turnable at least ninety degrees around a vertical axis,
      (iii) being mounted directly to, and within the recess of, a unique one of the, plurality of wheel set housings, and
      (iv) including means for permitting actively controlled retraction of the wheel set, the retraction of all wheel sets causing the bottom platform to approach street level to facilitate loading and unloading; and
   (d) a door arrangement disposed at the access opening.

2. A motor vehicle according to claim 1, wherein the door arrangement includes a plurality of doors that collectively have open and closed positions, each door capable of motorized movement along a single common guide rail, whereto in the closed position, the doors are non-overlapping and in the open position, the doors are stacked parallel to one another.

3. A motor vehicle according to claim 2, wherein each wheel set is independently steerable and fully turnable around a vertical axis.

4. A motor vehicle according to claim 2, wherein the vehicle has an outside, the vehicle further comprising:
   (c) a ramp, hingedly attached to the bottom platform proximate to the door arrangement, so that the ramp may be folded into an tip position that covers at least a portion of the door arrangement outside of the vehicle and unfolded into a down position, and in the down position it may provide a smooth transition from the bottom platform to street level.

5. A motor vehicle according to claim 2, wherein the doors in the open position are located outside of the access opening, so as to give full access to the interior region when the doors are in an open position.

6. A motor vehicle according to claim 1, wherein the vehicle has an outside, the vehicle further comprising:
   (c) a ramp, hingedly attached to the bottom platform proximate to the door arrangement, so that the ramp may be folded into an up position that covers at least a portion of the door arrangement outside of the vehicle and unfolded into a down position, and in the down position it may provide a smooth transition from the bottom platform to street level.

7. A motor vehicle according to claim 1, wherein each wheel set is independently steerable and fully turnable around a vertical axis.

8. A motor vehicle for carrying a load over a street, the vehicle comprising:
   (a) a bottom platform for carrying the load;
   (b) a frame of portal construction disposed over the bottom platform and mounted to it for bearing the load, the frame having left and right sides, a top, a front, and a rear, and a plurality of wheel set housings; the frame and the bottom platform defining an interior region, the interior region having at least one access opening;
   (c) a plurality of wheel sets, of which at least one pair of such wheel sets are laterally disposed from one another, each wheel set
      (i) having at least one wheel,
      (ii) being independently powered and turnable at least ninety degrees around a vertical axis,
      (iii) being mounted directly to a unique one of the plurality of wheel set housings, and
      (iv) including means for permitting actively controlled retraction of said wheel set, the retraction of all wheel sets causing the bottom platform to approach street level to facilitate loading and unloading; and
   (d) a door arrangement disposed at the access opening, the door arrangement including a plurality of doors that collectively have open and closed positions, each door capable of motorized movement along a single common guide rail, wherein in the closed position, the doors are non-overlapping and i the open position, the doors are stacked parallel to one another.

9. A motor vehicle according to claim 8, wherein the doors in the open position are located outside of the access opening, so as to give full access to the interior region when the doors are in an open position.

* * * * *

UNITED STATES PATENT AND TRADEMARK OFFICE
CERTIFICATE OF CORRECTION

PATENT NO. : 5,618,151
DATED : April 8, 1997
INVENTOR(S) : Volker H. Rosenkranz

It is certified that error appears in the above-indentified patent and that said Letters Patent is hereby corrected as shown below:

In column 5, line 36, delete "," after "the"
In column 5, line 47, change "whereto" to --wherein--
In column 6, line 1, change "tip" to --up--
In column 6, line 50, change "i" to --in--

Signed and Sealed this

Tenth Day of June, 1997

Attest:

BRUCE LEHMAN

Attesting Officer

Commissioner of Patents and Trademarks